UNITED STATES PATENT OFFICE.

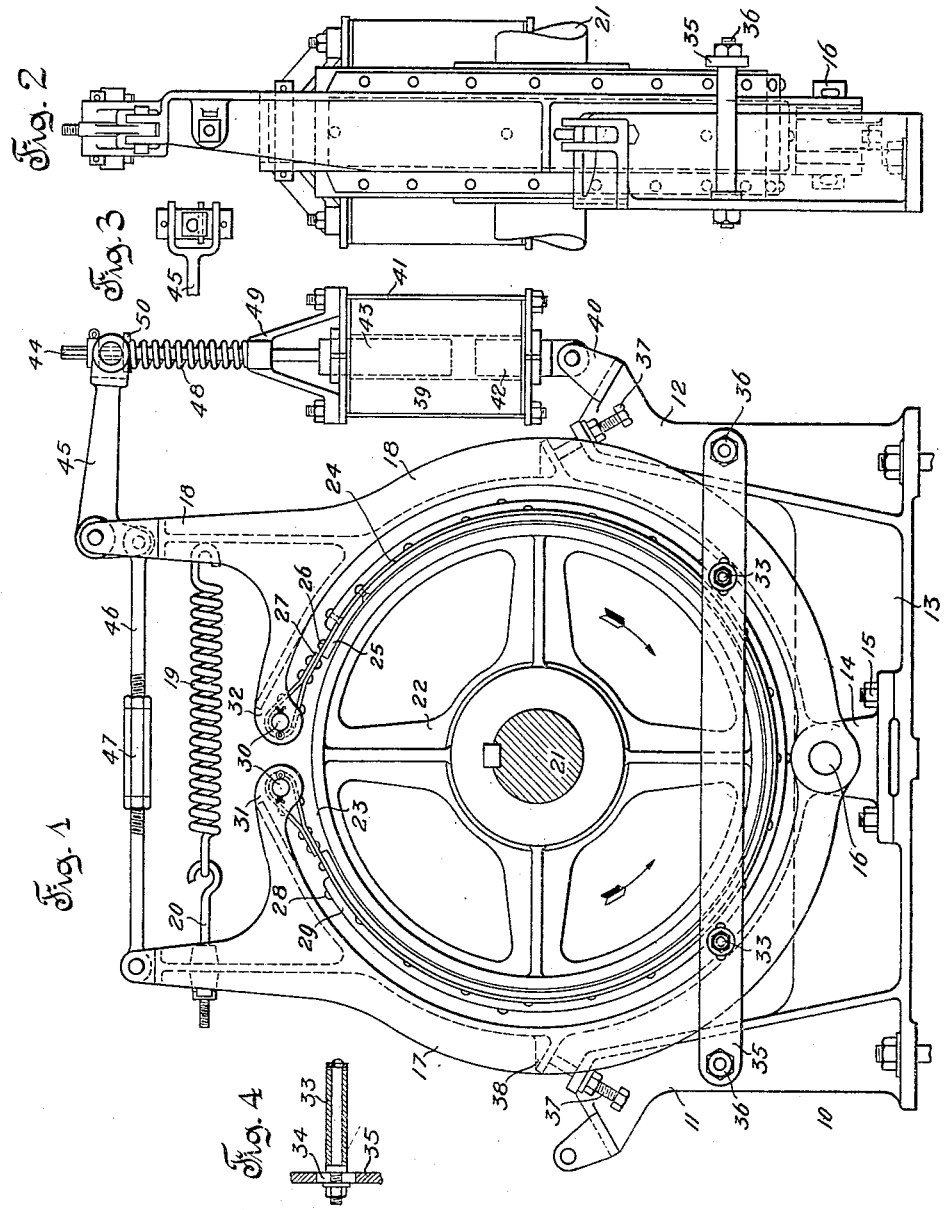

HALFDAN A. STEEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

BRAKE.

1,279,777.  Specification of Letters Patent.  Patented Sept. 24, 1918.

Application filed April 8, 1910, Serial No. 554,235. Renewed December 23, 1916. Serial No. 139,029.

*To all whom it may concern:*

Be it known that I, HALFDAN A. STEEN, a subject of the King of Norway, residing at Milwaukee, in the county of Milwaukee and State of Wisconsin, have invented certain new and useful Improvements in Brakes, of which the following is a full, clear, and exact specification.

This invention relates to brakes and particularly to band brakes.

The object of my invention is to improve this particular class of brakes, making a more simple and durable construction than is disclosed in the prior art, and having all the advantages of quick and effective action.

When motors are used for driving cranes and for operating hoists, it is advantageous to provide a braking device by which the motor is promptly and automatically brought to rest upon the interruption of the electric supply circuit connections or in case of accident to mechanical parts. This result is usually accomplished by providing a spring or some similar mechanical means for applying the brake and an electroresponsive device for releasing the brake. Band brakes have been employed for these purposes but retarding forces heretofore have not been obtained for both directions of motor rotation without sacrificing the efficiency of the brakes. The structural details of this improved band brake have been designed to avoid difficulties which heretofore have been troublesome.

The improved stationary contact member preferably comprises a band of asbestos interwoven with metal particles and which is in the form of an interrupted ring, and is adapted to engage practically the entire circumference of the brake wheel when the brake is applied. The inner diameter of the asbestos band is slightly greater than the outer diameter of the brake wheel thereby permitting the band to release itself readily from the outer surface of the wheel as soon as the pressure tending to apply the brake is released. A plurality of reinforcing members are wrapped around and secured to the asbestos ring, and the ends of one of these reinforcing members are secured to levers through which forces are transmitted for bringing the band into engagement with the wheel. A comparatively light spring is employed for setting or applying the band brake, thus permitting the use of a light electro magnet for releasing the same. The cost of the brakes is materially reduced by using springs and magnets which are light but still have the necessary requisites for good braking.

The various novel features of my invention will be apparent from the description and drawings and will be particularly pointed out in the appended claims.

In the accompanying sheet of drawings, Figure 1 is a side elevation of a brake designed in accordance with my invention;

Fig. 2 is an end elevation of the same, and

Figs. 3 and 4 are structural details of a lever member and a supporting member respectively to be referred to presently.

The main support or base 10 of the brake consists of two upwardly projecting portions 11 and 12 which are integrally connected by an intermediate portion 13. This intermediate portion 13 forms a support to which a pedestal 14 is secured by bolts 15. The pedestal 14 is provided with an opening for the reception of a pin 16 upon which are pivoted two arms 17 and 18 which are pressed toward each other by a spring 19. One end of the spring is secured to the upper portion of one of the arms 18 and the other end engages an adjustable hook 20 which is secured to the upper portion of the other arm 17. Mounted on a shaft 21 and keyed thereto is a brake wheel 22 which has a cylindrical braking surface 23. Interposed between the brake wheel 22 and the arms 17 and 18 is a brake band 24. This brake band 24 includes an inner strip 25 preferably of asbestos interwoven with metal particles and adapted to directly engage the cylindrical braking surface 23 of the wheel 22. This brake band of asbestos is secured by rivets 26 to a strip of metal 27 to which is also secured by rivets 28 a comparatively heavy reinforcing member 29. The ends of the brake band are secured by the metal band 27 to pins 30 which are located in projections 31 and 32 of the arms 17 and 18 respectively. The engaging surface of the brake band has a slightly greater radius of curvature than that of the wheel 22 which provides for the release of the brake band. The metal strip 27 to which the asbestos band is secured and which engages the pins 30 acts as a transmitting medium through which forces are transmitted to set and release the brake. Both the member 29 and the metal strip 27 to which it is secured act as reinforcing members and also give definite shape to the brake band.

When the brake is released it separates from the brake wheel an equal amount around the entire periphery, and is supported by adjustable studs 33 shown in detail in Fig. 4. These studs are so located as to hold the band at a predetermined distance from said wheel. The studs are secured in slotted portions 34 of a side piece 35 which is arranged to prevent the axial displacement of the wheel 22 should it for any reason become loosened from the shaft and have any tendency to fly off. The studs 33 may be dispensed with and the arms 17, 18 relied on as a seat or support for portions of the brake band when the latter is in unapplied condition. The side piece 35 is secured by bolts 36 to the projecting portions 11 and 12 which are provided with studs 37 to act as stops and which are adapted to engage small brackets 38 formed integrally with the arms 17 and 18 respectively.

The magnet 39 is pivotally secured to a forked portion 40 of the projection 12. This magnet comprises a frame 41 in which are located stationary and movable cores 42 and 43 respectively. The movable core is connected to a spring pressed rod 44 which engages a lever 45 pivotally mounted in the arm 18 and which is connected to a rod 46 secured to the upper end of the other arm 17. The rod 46 is provided with a turn buckle 47 for adjusting the effective length of the rod 46. The spring 48 located between the upper part of the magnet frame and a collar 50 on the rod 44 acts to counterbalance the weight of the magnet core 43 of the magnet.

When electrical connections are made, the motor being in operation, and the stationary and movable cores of the magnet being in engagement, the brake band 24 is out of engagement with the brake wheel 22 and the spring 19 is under tension tending to draw the arms 17 and 18 closer and setting the brake 24. When the electrical connections are broken, due to the action of spring 19 the movable core of the magnet is drawn away from the stationary core and the brake is forced into engagement with the brake wheel 22 immediately retarding and stopping the motor. As soon as the brake band is forced into contact with the brake surface 23 of the wheel 22 one of the brackets is forced into engagement with one of the studs 37 and a great force due to the band brake action is transmitted to the base 10.

The use of this brake is not limited for braking in one direction of rotation, but is equally effective for braking in both directions. This brake is simple, durable and effective and possesses all the desirable features necessary to a good brake of this class.

There may be many modifications in the precise form and arrangement herein shown and described and I aim in my claims to cover all such modifications which do not involve a departure from the spirit and scope of my invention.

What I claim as new is:

1. In combination with a brake wheel, a frame comprising pivotally mounted arms yieldingly pressed toward each other, a band connected to the arms of said frame and being adapted to engage a greater portion of the braking surface of the wheel, an abutment in position to be engaged by each arm, and means operatively connected to each of said arms on the same side of the pivotal point thereof as the point of attachment of said band thereto for exerting forces on the band to spring it into engagement with the wheel, the inner diameter of the band being slightly greater than the outer diameter of the wheel, and one arm engaging its abutment and the other arm moving relatively to the first arm in the application of the brake.

2. In combination with a brake wheel having a cylindrical outer surface, a frame comprising pivotally mounted arms yieldingly pressed toward each other, a brake band connected to said arms, said brake band being concentric with the wheel and of slightly greater radius of curvature, fixed abutments in position to be engaged by said arms and means for forcing the brake band into engagement with the outer surface of the wheel, said means being operatively connected to one of said arms on the same side of the pivotal point thereof as the point of attachment of said brake band thereto, and one or the other of said arms engaging its abutment during the application of the brake.

3. In combination with a brake wheel, pivotally mounted arms disposed at opposite sides of said wheel, a brake band secured to said arms, said arms being of substantially the same curvature as the periphery of said wheel and capable of forming a seat for said brake band when in released condition, means associated with said arms and normally acting to force said brake band into engagement with said wheel, and electro-responsive means for opposing the action of said first means, said brake band being capable of disengaging said brake wheel when the brake is released.

4. The combination with a brake wheel having a cylindrical surface and levers yieldingly pressed toward each other fulcrumed at a common point and located at each side of the wheel, of a band concentric with the cylindrical surface of the wheel and slightly separated therefrom, a reinforcing member wrapped about the band and secured thereto, and means for exerting equal and opposite forces on the levers to spring the band into engagement with the wheel, the ends of said reinforcing member being secured to the levers.

5. The combination with a brake wheel having a braking surface and levers fulcrumed at a common point and located one at each side of the wheel, of a band brake comprising a plurality of bands concentric with the rim of the wheel and slightly separated from its surface, and a spring connecting the corresponding ends of the levers to force the bands into engagement with the wheel, the ends of said bands being secured to corresponding ends of the levers.

6. The combination with a brake wheel, of pivoted arms extending around said wheel, a band adapted to engage the greater portion of the wheel's circumference, a second band secured to said arms and wrapped around the first band, stationary stops for maintaining a concentric relation between the brake band and the wheel when the brake is released, and means for exerting forces on the brake band to force it into engagement with the wheel, the inner diameter of the brake band being slightly greater than the outer diameter of the wheel.

7. The combination with a brake wheel and levers at all times yieldingly pressed toward each other fulcrumed at a common point and located one at each side of the wheel, of a brake band concentric with the rim of the wheel and slightly separated from its surface, stops limiting the movement of the levers, and means for exerting equal and opposite forces on the levers to spring the band into engagement with the wheel, the ends of said band being secured to their corresponding levers.

8. The combination with a brake wheel and stationary levers fulcrumed at a common point and located on opposite sides of the wheel, of a brake band concentric with the rim of the wheel and slightly separated from its surface, said band comprising two concentric strips secured together, stationary stops for limiting the movement of the levers, and a spring joining opposite ends of the levers for forcing the brake band into engagement with the wheel, the ends of the band being secured to their corresponding levers.

9. A brake effective in both directions of rotation and comprising a wheel, a band of slightly greater radius of curvature than the wheel, a second band wrapped around said first band and secured thereto, a reinforcing and shaping member secured to said second band, stationary stops for maintaining a concentric relation between the brake band and the wheel, and means for springing the brake band into engagement with the wheel.

10. In a brake, a brake band comprising a friction member, a second member wrapped around and to which is secured said friction member, a reinforcing and shaping member secured to said second member, and supporting means for said brake band, the ends of said second member being provided with means for attaching said band to said support.

11. A braking device, comprising an inner band of friction material, a second band to which is secured said first band and provided with means for the attachment of power-applying devices to said braking device, and a reinforcing and shaping member secured to said second band.

12. In combination with a brake wheel, a support mounted adjacent said brake wheel, an arm pivoted to said support, a brake band secured at one end to said pivoted arm and disposed between said brake wheel and a portion of said pivoted arm on the same side of the pivotal point thereof as the point of attachment of said brake band thereto, said portion of the pivoted arm being disposed in position to form a support for said brake band when the latter is in released condition.

13. In combination with a brake wheel, a support mounted adjacent said brake wheel, a plurality of arms pivoted to said support, a brake band secured at its ends to said pivoted arms and disposed between said brake wheel and portions of said arms on the same sides of the pivotal points thereof as the corresponding points of attachment of said brake band thereto, said portions of the pivoted arms being disposed in position to form a support for said brake band when the latter is in released condition.

14. In a brake, the combination of a support, a plurality of arms pivoted to said support, a brake band attached at its ends to said pivoted arms, a resilient connection between said arms serving to actuate said brake band to applied position, and electro-responsive means operative to overcome the effect of said resilient connection and cause the release of said brake, said arms being disposed in position to form a support for the body portion of said brake band when the latter is in released position.

15. In a brake, a support, an arm pivotally mounted on said support, a frictional braking member attached to said pivoted arm, resilient means associated with said arm on the same side of the pivotal point thereof as the point of attachment of said braking member thereto and normally acting to force said braking member into applied position, and means associated with the support for said pivoted arm and axially outside of said braking member for limiting the axial movement of a wheel to which said brake may be applied.

16. In combination with a brake wheel, a support, a plurality of arms pivoted to said support at one side of a plane of the axis of said brake wheel and extending about a portion of said wheel to the opposite side of said plane, a brake band secured at its ends to portions of said pivoted arms at the latter side of said plane and disposed between said arms and said wheel, and resilient means operatively connected to each of said arms on the same side of the pivotal point thereof as the point of attachment of said brake band thereto for urging said band into engagement with said brake wheel.

17. In combination with a brake wheel, a support mounted adjacent said brake wheel, an arm pivoted to said support, and a brake band secured at one end to said pivoted arm and disposed between said brake wheel and a portion of said arm on the same side of the pivotal point thereof as the point of attachment of said brake band thereto, said portion of the pivoted arm constituting a major portion of said arm and being of the same general curvature as the periphery of said brake wheel.

18. In combination with a brake wheel, a support mounted adjacent said brake wheel, an arm pivoted to said support, a brake band secured at one end to said pivoted arm and disposed between said brake wheel and a portion of said arm, and means for applying said brake band to said wheel for braking purposes, said means being operatively connected to said arm on the same side of the pivotal point thereof as the point of attachment of said brake band thereto.

19. In combination with a brake wheel, a support mounted adjacent said brake wheel, a plurality of arms pivoted to said support, a brake band secured at its ends to said pivoted arms and disposed between said brake wheel and portions of said arms on the same sides of the pivotal points thereof as the respective points of attachment of said brake band, and means for applying said brake band to said wheel for braking purposes, said means being operatively connected to each of said arms on the same side of the pivotal point thereof as the corresponding point of attachment of said brake band thereto.

20. In a brake, the combination of a support, a plurality of arms pivoted to said support, a brake band attached at its ends to said pivoted arms, and means for actuating said brake band to applied position, said means being operatively connected to each of said arms on the same side of the pivotal point thereof as the point of attachment of said brake band thereto.

21. In combination with a brake wheel, a support, a plurality of arms pivoted to said support at one side of a plane in which the axis of said brake wheel lies and extending about a portion of the wheel to the opposite side of said plane, a brake band secured at its ends to portions of said pivoted arms at the latter side of said plane and disposed between said arms and said wheel, and resilient means operatively connected to said arms on the same sides of the pivotal points thereof as the corresponding points of attachment of said brake band thereto for urging said band into engagement with said brake wheel.

22. In combination with a brake wheel, a support, a plurality of levers pivoted at their ends about a common axis and disposed on opposite sides of said brake wheel, a brake band operatively associated with said brake wheel and secured at its ends to said levers adjacent the free ends thereof, and a stop for limiting the movement of one of said levers on the application of said brake band to said wheel.

23. In combination with a brake wheel mounted on a substantially horizontal shaft, a support, a plurality of levers pivoted below a horizontal plane through the axis of said brake wheel and having major portions thereof of substantially the same curvature as the periphery of said brake wheel, a brake band disposed for operative engagement with said brake wheel and secured at its ends to said pivoted levers at points above said horizontal plane.

24. In combination with a brake wheel mounted on a horizontally disposed shaft, a support, a plurality of levers pivoted adjacent one end thereof below a horizontal plane through the axis of said brake wheel and extending along said brake wheel at opposite sides thereof to points above said horizontal plane, a braking device arranged for operative engagement with said brake wheel and operatively connected to said pivoted arms at points above said horizontal plane, and means for applying said brake, said means being operatively connected to said arms adjacent the free ends thereof.

25. In combination, a support, a pair of arms fulcrumed at a common point, a brake band connected at its ends to said pivoted arms, means for limiting the pivotal movement of each of said arms in one direction, and means operative to cause the application of said brake to a brake wheel with which it may be associated, the actuation of said means causing the engagement of one or the other of said pivoted arms with said limiting means.

26. In combination with a brake wheel, a support, spaced portions or pedestals on said support, said brake wheel being mounted between said pedestals and the latter being approximately equally spaced from said wheel, a pair of levers pivoted to said support and having portions thereof lying between said pedestals and said wheel, a braking device secured to said pivoted arms and disposed for operative engagement with said brake wheel, stops carried by said pedestals for limiting the movement of said levers in one or the other direction, means operatively associated with said levers and normally acting to set said braking device, and means operative to oppose said brake-setting means and to release said brake.

27. In a brake, the combination of a support, a plurality of elements pivotally mounted on said support, a brake band attached at its ends to said elements, and means for actuating said brake band to applied position, said means being operatively connected to each of said elements on the same side of the pivotal point thereof as the point of attachment of said brake band thereto.

28. In combination with a brake wheel, a support mounted adjacent said brake wheel, an element mounted on said support and capable of movement about its point of mounting on said support, a brake band secured at one end to said element and disposed between said brake wheel and a portion of said element on the same side of said point of mounting thereof as the point of attachment of said brake band thereto, said portion of said element being disposed in position to form a support for said brake band when the latter is in released condition.

29. In combination with a brake wheel, a support mounted adjacent said brake wheel, a plurality of elements mounted on said support and having portions capable of movement about the points of mounting thereof, a brake band secured at its ends to said elements and disposed between said brake wheel and portions of said elements on the same sides of the points of mounting of the elements as the corresponding points of attachment of said brake band thereto, said portions of said elements being disposed in position to form a support for said brake band when the latter is in released condition.

30. In combination with a brake wheel, a support, a plurality of elements mounted on said support and capable of movement about their points of mounting, the points of mounting of said elements being at one side of a plane of the axis of said brake wheel and the elements being capable of extending about a portion of said wheel to the opposite side of said plane, a brake band secured at its ends to portions of said elements at the latter side of said plane and disposed between said elements and said wheel, and resilient means operatively connected to each of said elements on the same side of the point of mounting thereof as the point of attachment of said brake band thereto for urging said band into engagement with said brake wheel.

31. In combination with a brake wheel, a support mounted adjacent said brake wheel, an element mounted on said support and movable about its point of mounting, a brake of the band type secured adjacent one end to said element and disposed between said brake wheel and a portion of said element, and means for applying said brake to said wheel for braking purposes, said means being operatively connected to said element on the same side of the point of mounting thereof as the point of attachment of said brake thereto.

32. In combination, a rotatable member, a brake band for said member, a plurality of arms pivotally mounted about the same axis, operating connections between said pivoted arms and said brake band, means associated with said arms and normally capable of effecting the application of said brake, and means normally inoperative and effective to overcome said first means and render said brake inoperative.

33. A brake comprising a wheel, a contact band wrapped about the wheel, levers pivoted both on the same side of the wheel and respectively connected to the ends of the band, a spring connecting corresponding ends of the levers for applying the band to the wheel, means for actuating said levers to release the band from the wheel, and stops for limiting the movement of the levers in order to resist the braking action in either direction of wheel rotation.

34. A brake comprising a wheel, a contact band wrapped about the wheel, levers pivoted on the same side of the wheel and having portions disposed at opposite sides of the wheel and respectively connected to the ends of the band, a spring connecting corresponding ends of the levers for applying the band to the wheel, means for actuating said levers to release the band from the wheel, and stops for limiting the movement of the levers in order to resist the braking action in either direction of wheel rotation.

35. In combination, a brake wheel, a pair of arms fulcrumed at the same side of said wheel, a brake band connected at its ends to said pivoted arms, means for limiting the pivotal movement of each of said arms in one direction and means operative to cause the application of said brake to said brake wheel, the actuation of said latter means causing the engagement of one or the other of said pivoted arms with said limiting means.

36. In a brake, the combination of a support, a plurality of arms pivotally mounted on said support and fulcrumed at a common point, frictional braking means loosely mounted on said arms, resilient means for actuating said arms to effect the application of said braking means, and means associated with said arms and operative to overcome said actuating means for causing the release of said braking means, said releasing means and said actuating means being operatively connected to said arms on the same side of pivotal point thereof as the point of attachment of said braking means thereto.

37. In combination with a brake-wheel, a brake comprising a support, a plurality of arms pivotally mounted on said support at one side of a plane through the axis of said wheel, frictional braking means loosely mounted on said arms, means for actuating said arms to effect the application of said braking means, and means operative to overcome said actuating means for causing the release of said braking means, said releasing means and said actuating means being operatively connected to said arms at points on the side of said plane through the axis of said wheel opposite to that on which the points of mounting of said arms are located.

38. In combination, a brake wheel, means comprising a plurality of pivoted arms for applying frictional braking effects to said brake wheel, means for effecting the release of said applying means, said releasing means comprising an electromagnet having fixed and movable elements, a lever pivotally mounted on one of said arms, and an operating rod connected to said lever and the other of said arms, and resilient means associated with the movable element of said electromagnet for insuring that said element is in unattracted position when said electromagnet is in unenergized condition.

39. In combination, a brake wheel, means comprising a plurality of pivoted arms for applying frictional braking effects to said wheel, means for effecting the release of said applying means, said releasing means comprising a leverage connection between said arms and including links pivotally connected to said arms and to each other, said links being movable to carry the pivotal points thereof toward alinement when moved to cause release of said applying means, and means associated with one of said links for adjusting the effective length thereof.

40. In combination, a brake wheel, means for frictionally engaging said brake wheel to exercise retarding effects thereon, means for applying said retarding means to said brake wheel, said applying means comprising a pivotally mounted arm to which said retarding means is attached, means for causing release of said retarding means and comprising an electromagnet having fixed and movable parts and a leverage connection between said movable part and said arm, said leverage connection comprising a plurality of pivotally mounted links pivotally connected together, one of said links being attached to said arm, and resilient means for insuring movement of the movable part of said electromagnet and said links out of brake-released position when said electromagnet is deënergized.

41. In combination, a brake wheel, means for frictionally engaging said brake wheel to exercise retarding effects thereon, means for applying said retarding means to said brake wheel, said applying means comprising a pivotally mounted arm to which said retarding means is attached, means for causing release of said retarding means and comprising a leverage connection comprising a plurality of pivotally mounted links pivotally connected together and movable so as to carry the pivotal points thereof toward alinement when moved to cause release of said applying means, one of said links being attached to said arm, and means associated with one of said links for adjusting the effective length thereof.

In testimony whereof I affix my signature in the presence of two witnesses.

HALFDAN A. STEEN.

Witnesses:
CHAS. L. BYRON,
ROB. E. STOLL.